Figure 1:
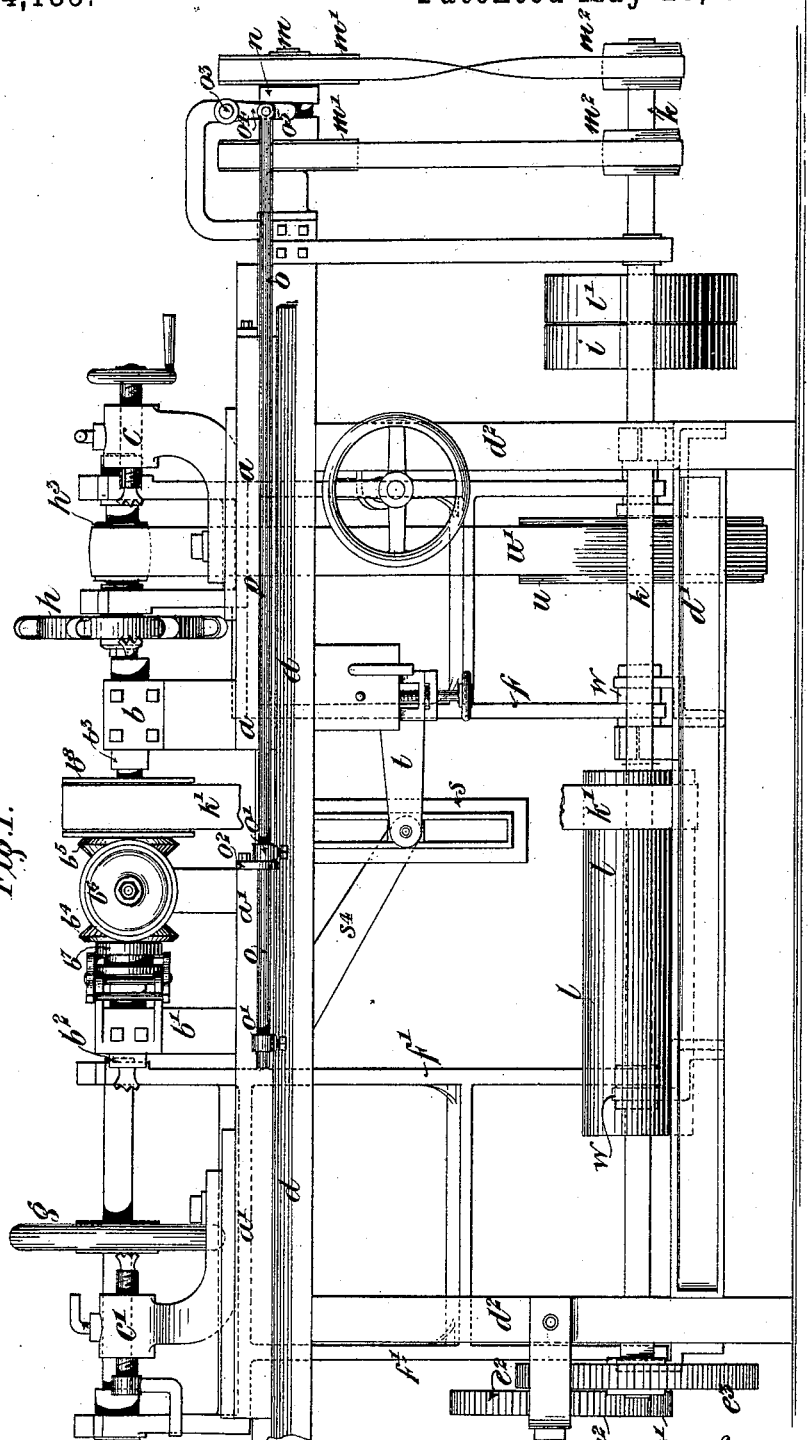

(No Model.) 9 Sheets—Sheet 2.

C. W. EVANS.
MACHINERY FOR THE MANUFACTURE OF BOOT AND SHOE LASTS.

No. 404,185. Patented May 28, 1889.

Witnesses
Chas. H. Smith
J. Staib

Inventor
Charles W. Evans
for Lemuel W. Serrell
atty

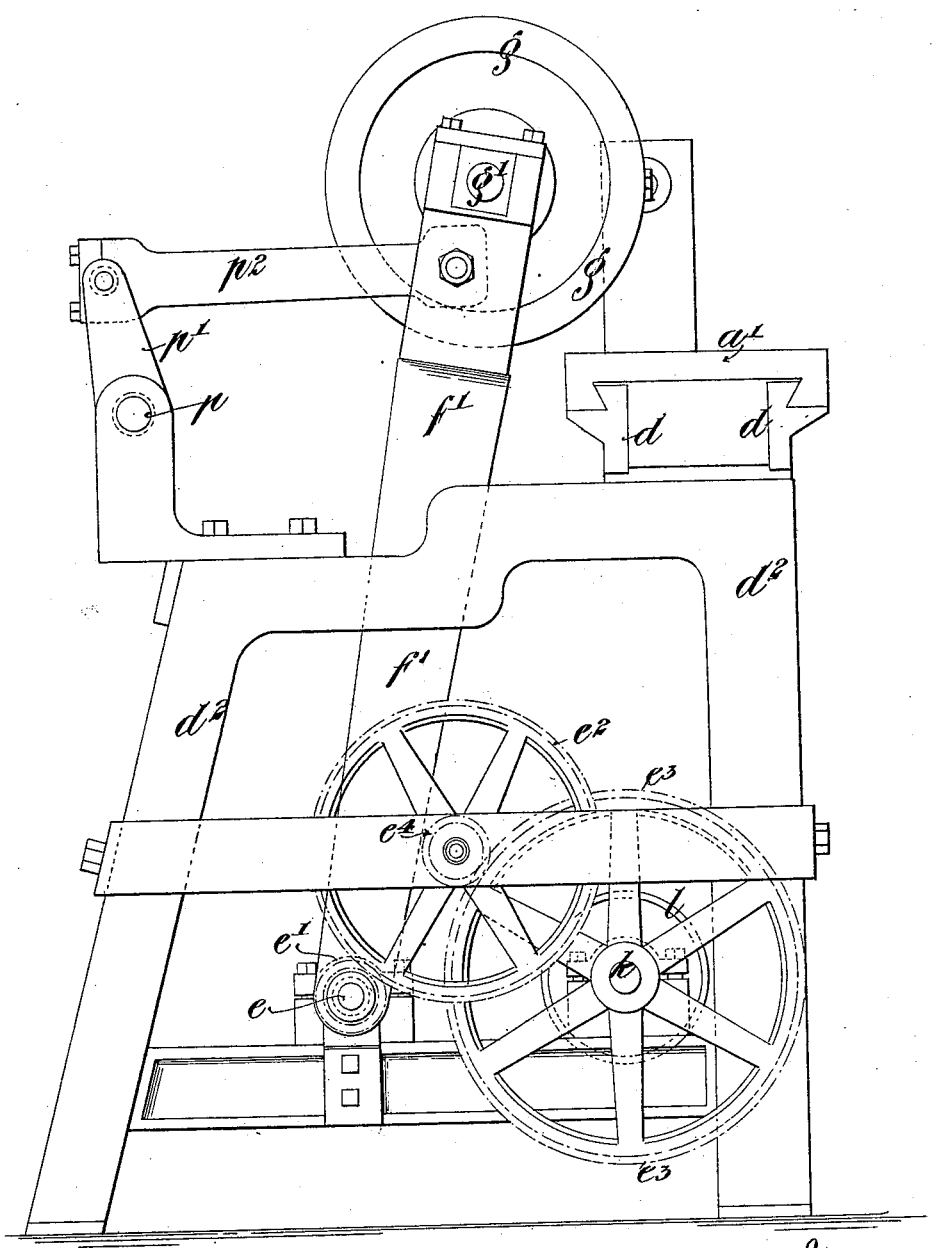

(No Model.) 9 Sheets—Sheet 4.
C. W. EVANS.
MACHINERY FOR THE MANUFACTURE OF BOOT AND SHOE LASTS.
No. 404,185. Patented May 28, 1889.
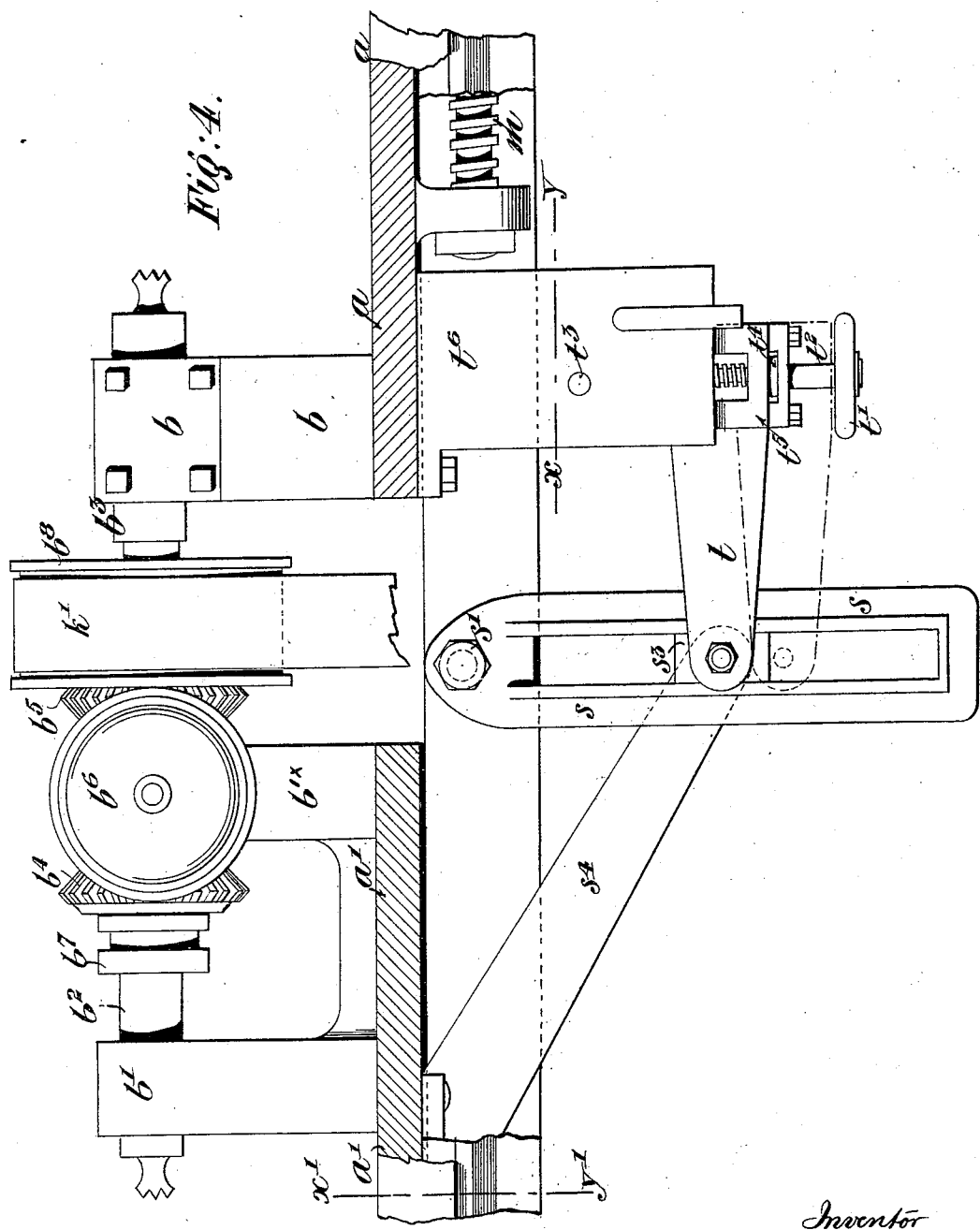

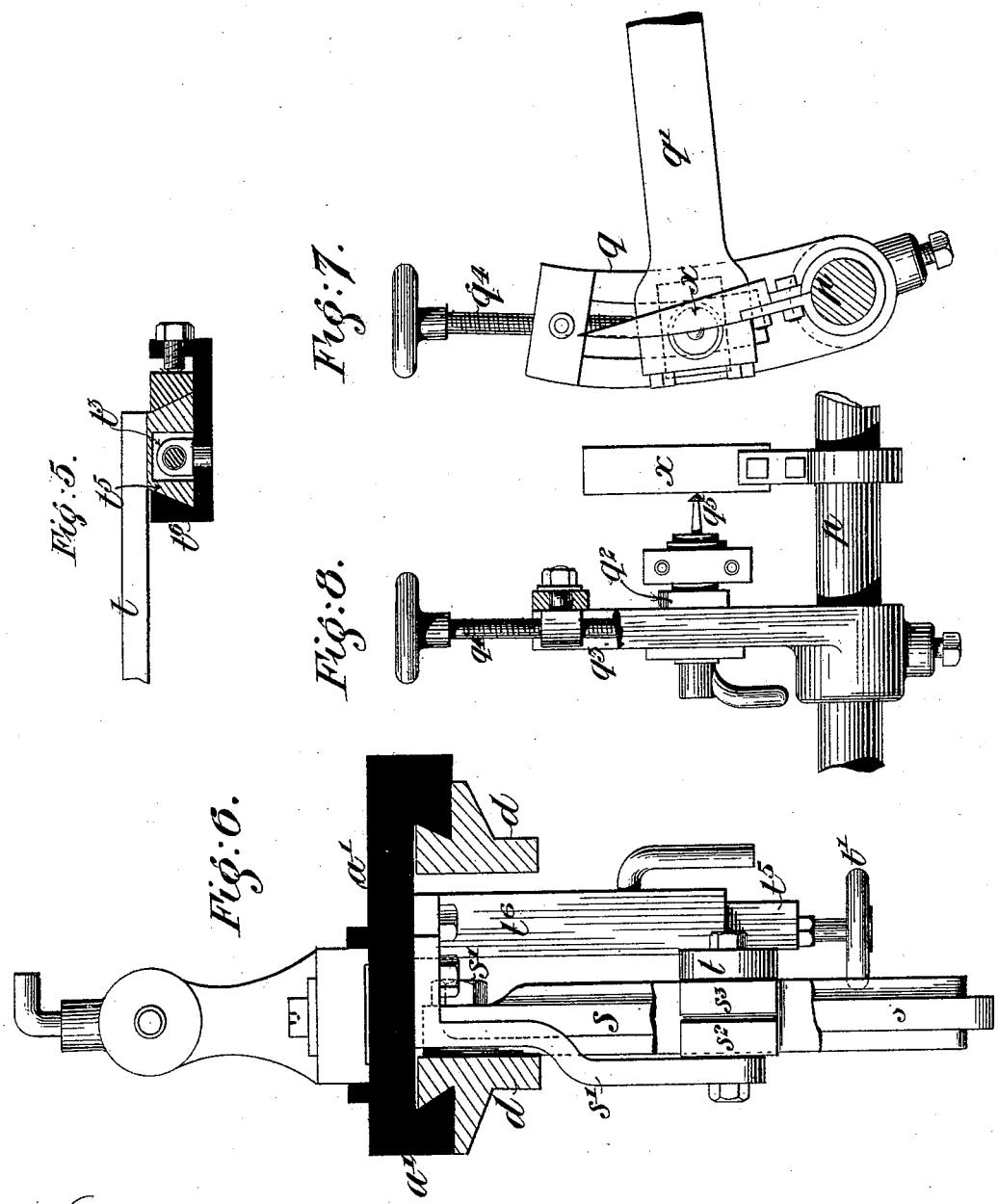

(No Model.) 9 Sheets—Sheet 6.
C. W. EVANS.
MACHINERY FOR THE MANUFACTURE OF BOOT AND SHOE LASTS.
No. 404,185. Patented May 28, 1889.
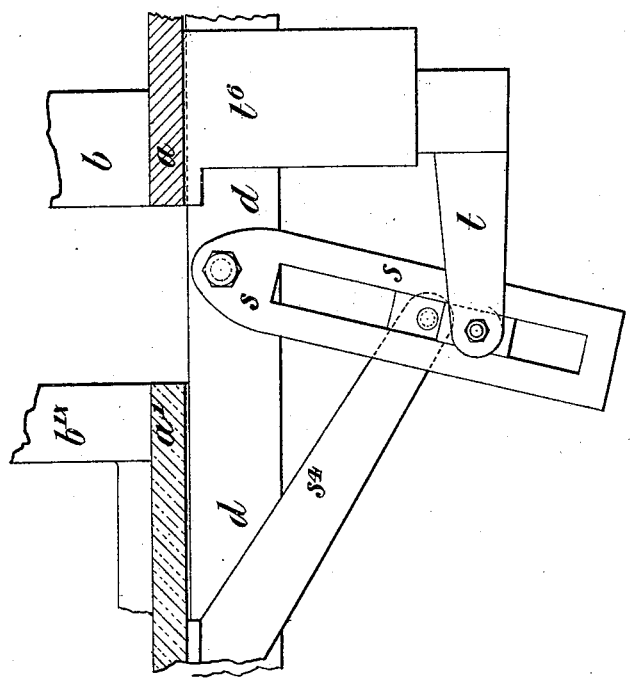
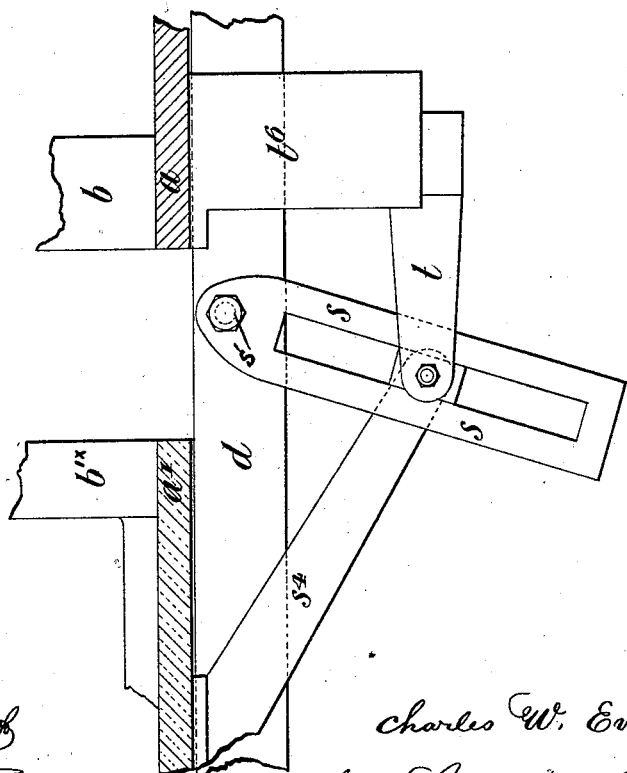
Witnesses
Chas. N. Smith
J. Hait
Inventor
Charles W. Evans.
per Lemuel W. Serrell
atty
N. PETERS, Photo-Lithographer, Washington, D. C.

(No Model.) 9 Sheets—Sheet 7.

C. W. EVANS.
MACHINERY FOR THE MANUFACTURE OF BOOT AND SHOE LASTS.

No. 404,185. Patented May 28, 1889.

Witnesses
Chas. H. Smith
J. Stail

Inventor
Charles W. Evans
for Lemuel W. Serrell
atty

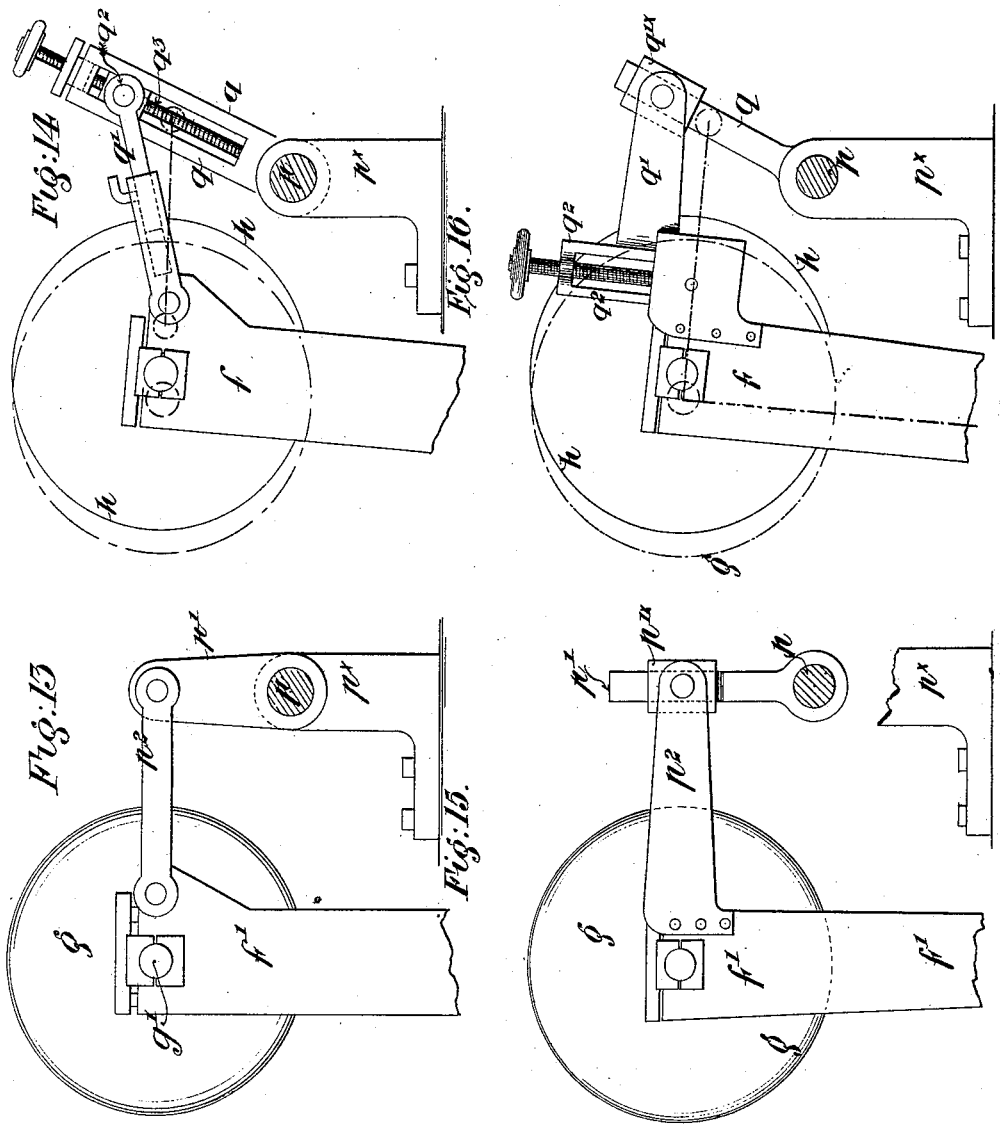

UNITED STATES PATENT OFFICE.

CHARLES W. EVANS, OF OLD COMPTON STREET, COUNTY OF MIDDLESEX, ENGLAND.

MACHINERY FOR THE MANUFACTURE OF BOOT AND SHOE LASTS.

SPECIFICATION forming part of Letters Patent No. 404,185, dated May 28, 1889.

Application filed January 23, 1888. Serial No. 261,573. (No model.) Patented in England May 17, 1887, No. 7,180; in France October 1, 1887, No. 186,163; in Belgium October 1, 1887, No. 79,062, and in Germany December 17, 1887, No. 44,215.

*To all whom it may concern:*

Be it known that I, CHARLES WESLEY EVANS, a subject of the Queen of Great Britain, residing at Old Compton Street, in the county of Middlesex, England, have invented certain new and useful Improvements in and Connected with Machinery for the Manufacture of Boot and Shoe Lasts and other Forms, (for which I have obtained Letters Patent in Great Britain, dated May 17, 1887, No. 7,180; in France, dated October 1, 1887, No. 186,163; in Belgium, dated October 1, 1887, No. 79,062, and in Germany, dated December 17, 1887, No. 44,215,) of which the following is a specification.

The object of my invention is to produce machinery capable of working on one and the same machine any length or style of last, and whether slender, medium, or full, or men's, women's, or children's sizes, as may be required, the last being produced in proportion to, or, in other words, in proportional symmetry to or from one model in every respect to that of the model, whether the size required be larger or smaller than the model. Each and every part of the last or other form produced will be cut to the proper proportion of the model, no matter what size is required. Attempts have heretofore been made to produce machines for reproducing any number of lasts that may be required from any given model; but prior to my invention I am not aware that any machine has been made that will produce lasts of varying sizes and in proportion or symmetrical in contour according to the sizes required without changing the model, and the following is a description of a machine suitable for carrying my invention into effect.

The head-stock bed of the machine is made in two parts having a head-stock and a tail-stock on each. One set holds the pattern, and the other set the wood log or block from which the various properly-proportioned sizes of lasts and other forms are to be cut. These head-stock beds or saddles are carried and slide on an ordinary lathe-bed or frame-work resting or supported by suitable standards. The back and lower part of the frame carries a longitudinal shaft having two rocking frames loose thereon, one of which carries the plain or dummy pattern-wheel and the other the cutter-wheel. The main driving-pulley is on this shaft, and by suitable gearing drives another longitudinal shaft on the lower front part of the machine carrying a roller or drum, round which a strap passes to a pulley which drives the lathe-centers. The latter shaft drives by change or other gearing an auxiliary shaft, which by pulley and belt is connected to the traversing screw of the lathe, which screw moves when required both head-stock beds or saddles of the lathe, the head-stock bed which carries the wood to be cut being connected to the other head-stock bed by link or quadrant motion, as hereinafter more fully described. The traversing-screw is provided with two pulleys driven in reverse directions, either of which may be held to the screw by a sliding clutch operated by a rod passing through an eye fixed on the model head-stock bed. The rod is provided with adjustable collars, which, when moved by contact with the eye on the traveling bed, operate the clutch and arrest the travel of the head-stock beds.

The rocking frame before mentioned, carrying the pattern or dummy wheel, is connected at back to a longitudinal counterbalanced shaft by connecting-rods and cranks on the said shaft. The rocking frame carrying the cutter is connected through a connecting-rod to a segment or quadrant arm on the longitudinal shaft. On the connecting-rod there is a sliding block which works in the segment-slot, and the position of this block is adjusted and fixed therein by screw or other convenient means.

According to the patterns of last or form required to be produced, so the position of the block in the segment-slot must be adjusted. The head-stock beds or saddles are connected together by such a segment and sliding block working in the same, or they may be connected by a link-motion, as follows: The bolt on which the link turns is fixed to the frame of the machine underneath the lathe-bed. This link is slotted. In the slot there are two sliding blocks. One of them—the back block—is fixed to an arm on the pattern or dummy head-stock bed or saddle. The front block is fixed to a vertically-adjustable arm on the other head-stock bed. The front and back blocks can pass each other in the slot, the front block being placed over or to the exact position of the back or fixed block. When thus linked, the two head-stock beds travel an equal distance in a given time; but by changing the position of the front block, which position is determined by the length required, any required length can be obtained—that is, any variation of travel between the two head-stock beds or saddles that may be required to accommodate the difference between the pattern and the last or other forms to be cut.

The cutter is driven from a pulley on the swinging-frame axis, and can be removed from the form being cut by screw worked by wheel at the front of the machine.

Machines constructed according to my invention are capable of cutting other forms than boot and shoe lasts—such as boot-tree work and gunstocks and other forms—although it is particularly designed for boot and shoe lasts.

In order that my invention may be fully understood and readily carried into effect, I will describe the same as applied to a last-turning machine of ordinary lathe type.

Similar letters of reference refer to like parts in all the figures.

Figure 2:
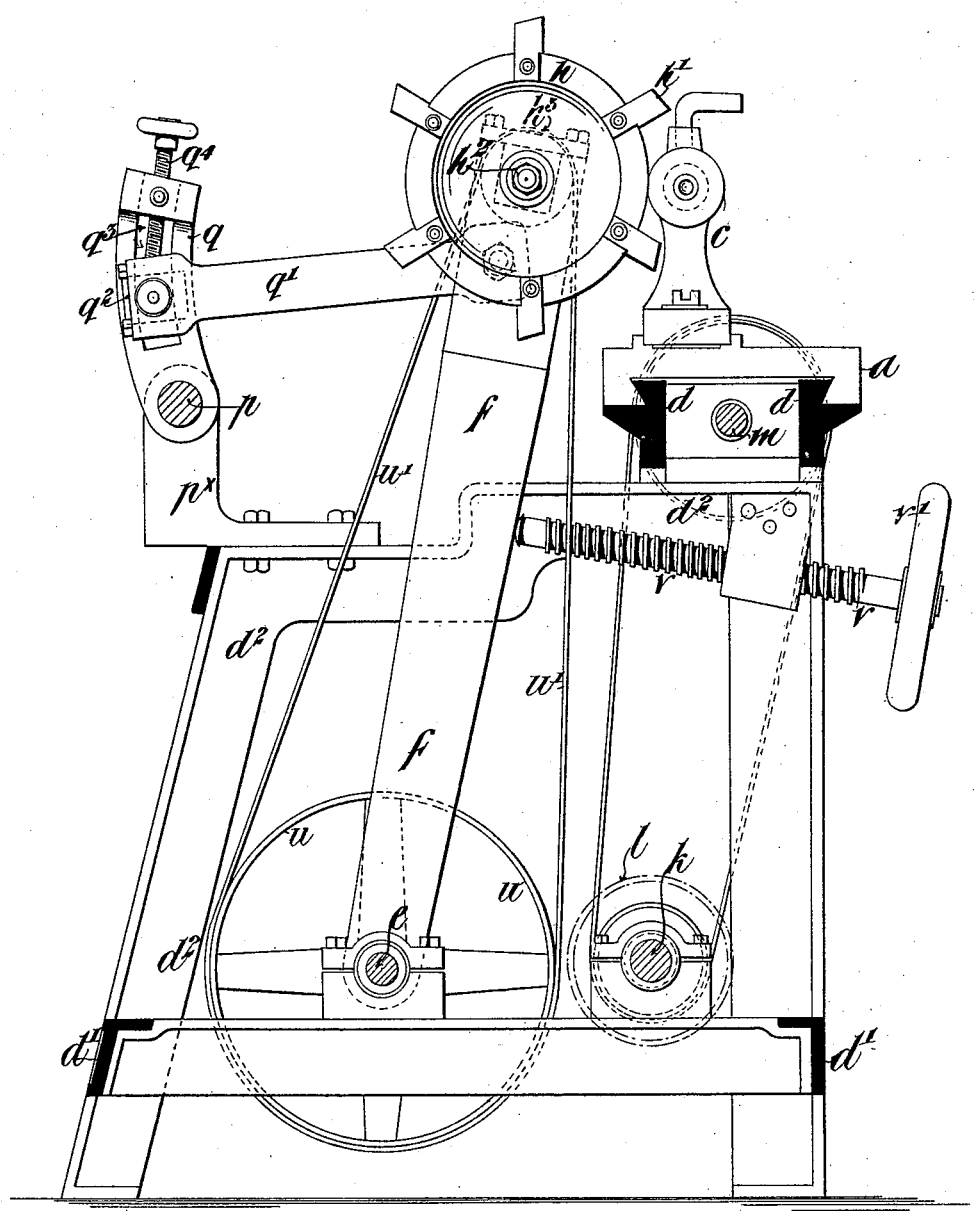
Figure 11:
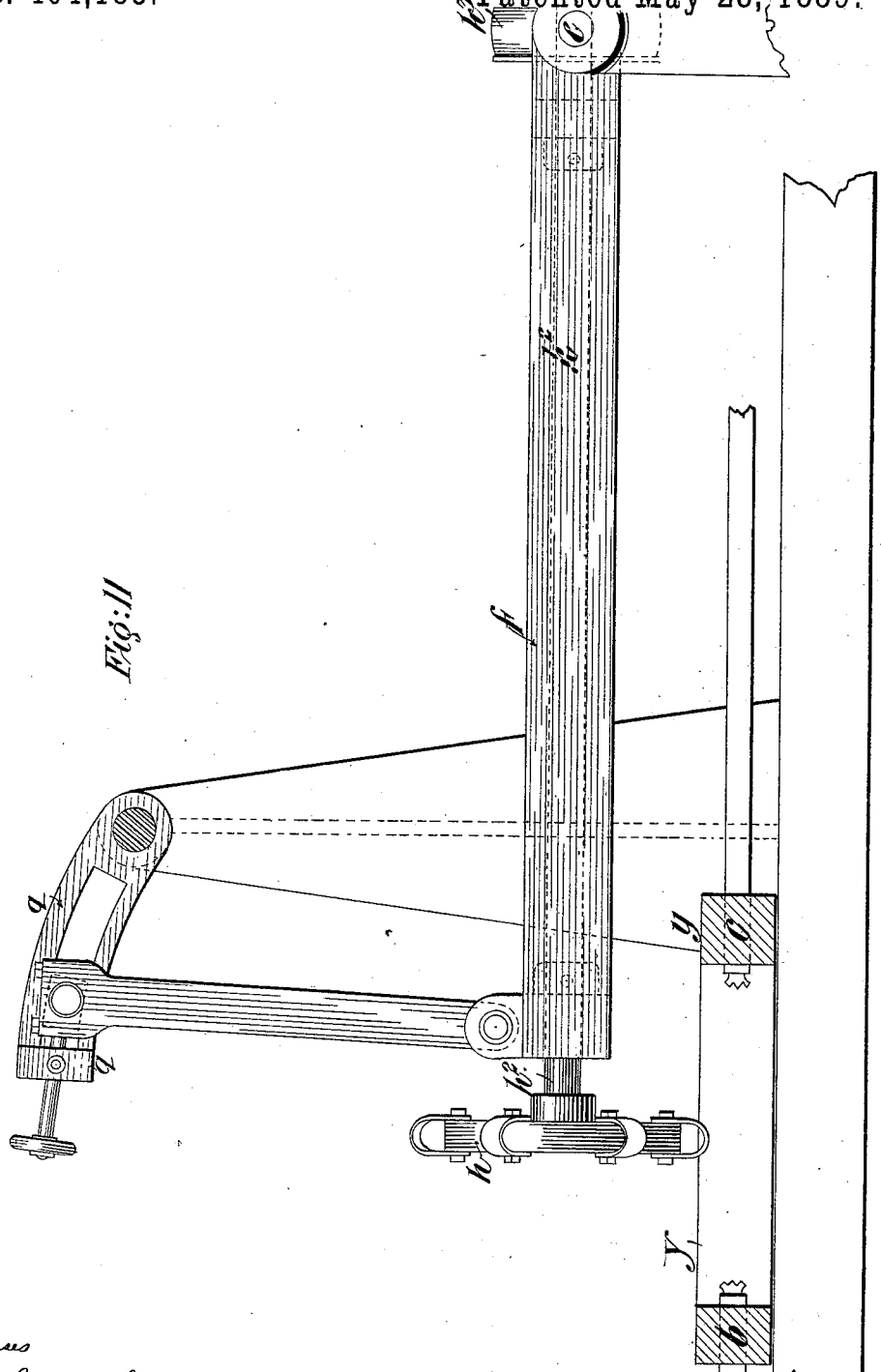
Figure 12:
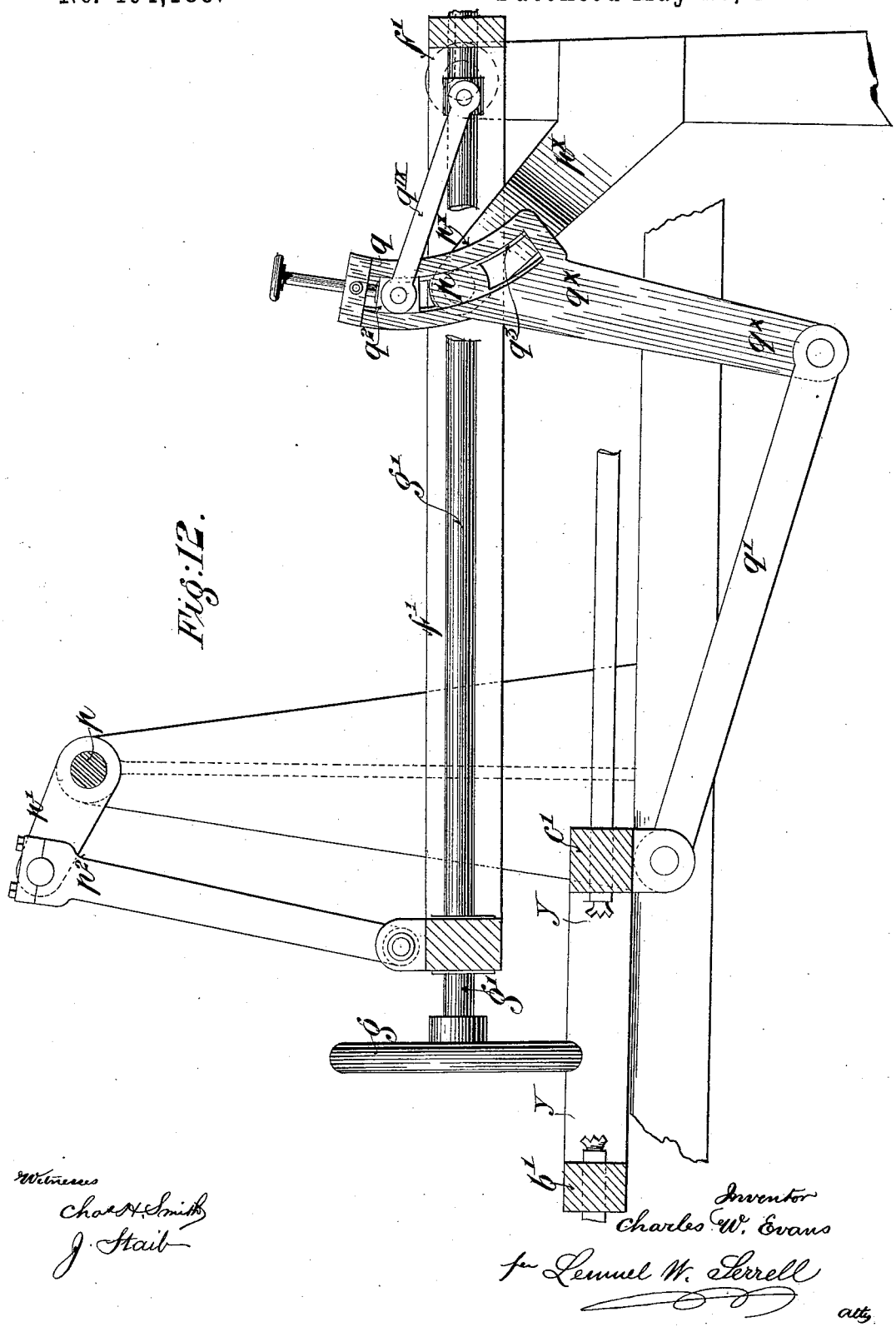

Figure 1 is a front elevation of such a machine, showing my improvements applied thereto according to my invention. Fig. 2 is a vertical cross-section on a larger scale than Fig. 1, showing the arrangement of cutter mechanism. Fig. 3 is an end view showing the pattern end of the machine. Fig. 4 is an enlarged part front sectional elevation showing the head-stocks and connections, together with link-motion for obtaining a proportional variation in the travel of the two saddles carrying such head-stocks, as hereinafter described. Fig. 5 is a horizontal section on the line $x\,y$ of Fig. 4. Fig. 6 is a vertical cross-section on line $x'\,y'$ of Fig. 4. Fig. 7 is an enlarged side elevation showing the sector-arm detached. Fig. 8 is a back elevation of same. Figs. 9 and 10 are diagram views illustrating various positions of the proportional link-motion. Figs. 11 and 12 illustrate my improvements as applied to a somewhat modified arrangement of machine from that shown in the previous figures, Fig. 11 being an elevation of the cutter arrangements and Fig. 12 an elevation of the pattern-wheel arrangement. So much of the machine is shown as will be necessary to understand and carry out the application of my invention thereto. Figs. 13 and 14 show another somewhat modified arrangement for the dummy and cutter wheel mechanism, Fig. 13 showing wheel and Fig. 14 the cutter-wheel. Figs. 15 and 16 show, in end elevation, another modification for the dummy and cutter wheel mechanism, Fig. 15 showing the dummy and Fig. 16 the cutter wheel.

Referring more particularly to Figs. 1 to 10, $a\,a'$ are the head-stock beds or saddles of the lathe.

$b\,b'$ are the head-stocks; $c\,c'$, the tail-stocks.

$d$ is the lathe-bed, $d'$ the frame-work, and $d^2$ the standards.

$e$ is the back longitudinal shaft.

$f\,f'$ are the rocking frames.

$g$ is the dummy pattern-wheel keyed onto shaft $g'$, running in bearings on the rock-frame $f'$.

$h$ is the cutter-wheel on the rock-frame $f$, Fig. 2, and $h'$ are the cutters thereon.

$i\,i'$ are the fast and loose main driving-pulleys on the shaft $e$, Figs. 2 and 3.

$k$ is the front longitudinal shaft, and $e'\,e^2\,e^3\,e^4$ are the gear-wheels connecting the front shaft, $k$, and the back shaft, $e$.

$l$ is the roller or drum on the shaft $k$, which, by the strap $k'$, drives the lathe-centers.

$m$, Figs. 2 and 4, is the traversing-screw of the lathe.

$m'\,m'$ and $m^2\,m^2$, Fig. 1, are the pulleys and belts connecting the traversing-screw $m$ with the shaft $k$.

$n$ is the clutch for connecting either of the pulleys $m'$ to the traversing-screw $m$, as may be required.

$o$ is the rod for operating the clutch $n$.

$o'\,o'$ are the adjustable collars.

$o^2$ is the eye on the sliding saddle.

$o^3$ is the rock-shaft; $o^4\,o^5$, the arms on the rock-shaft $o^3$, by which motion is transmitted from $o$ to clutch $n$.

$p$ is the longitudinal counterbalanced shaft; $p'$, Fig. 3, the crank, and $p^2$ the connecting-rod for connecting rocking frame $f'$ to the shaft $p$.

$q$ is the segment or quadrant arm.

$q'$ is the connecting-rod from the segment-arm to the rocking frame $f$.

$q^2$ is the sliding block in the segment-slot $q^3$ of the quadrant-arm $q$.

$q^4$ is the adjusting-screw; $s$, Figs. 1, 4, and 6, is the slotted link forming part of the proportional motion connecting the two sliding saddles $a\,a'$.

$s'$ is the bolt in the bed $d$ of the machine, on which the link $s$ swings.

$s^2\,s^3$ (best seen at Fig. 6) are the two sliding blocks in the slot of the link $s$.

$s^4$ is an arm fixed at one end to the pattern bed or saddle $a'$ and at the other to the block $s^2$.

$t$ is the vertically-adjustable arm on the sliding saddle $a$, to which arm the block $s^3$ is fixed.

$u$, Figs. 1 and 2, is the pulley on the shaft $e$, which, by belt $u'$, drives the cutter-wheel axle $h^2$ by pulley $h^3$ thereon.

$v$ is the screw, and $v'$ the hand-wheel for removing the swing-frame $f$ from the form to be cut.

The two head-stock centers, having bearings on the sliding beds or saddles $a$ $a'$, are carried by a shaft, $b^2$ $b^3$, divided between the saddles, the division being steadied by a dowel.

$b^4$ is a bevel-wheel on the part $b^2$ of the shaft, and $b^5$ a like bevel-wheel on the part $b^3$.

$b^6$ is a bevel-wheel on a stud-axle from the bearing-block $b^{ix}$ on the saddle $a'$.

$b^7$ is a clutch-block on the shaft $b^2$, and is provided with a feather, by which the two parts of the shaft $b^2$ $b^3$ may be connected together.

$b^8$ is a pulley on the shaft $b^3$, driven by the belt $k'$ from the drum $l$, before mentioned.

$w$ $w$, Fig. 1, are sleeve-pieces round the shaft $e$, on which the frames $f$ $f'$ rock.

A pattern to which the required form is to be cut having been fitted between the centers $b'$ $c'$ of the saddle $a'$ and a block from which the required form is to be produced, corresponding symmetrically to the said pattern, having been placed or fitted between the centers $b$ $c$ of the saddle $a$, the position of the parts of the machine are then to be adjusted so as to cause the beds $a$ and $a'$ to move with speeds in accordance with and in proportion to the difference in length of the last required to be produced from the pattern. For example, if the pattern is eleven inches long and it is required to produce a last twelve and one-third inches long, then when the link $s$ is in a vertical position, as shown at Fig. 4, the arm $t$ can be brought down to the position required in the slot—for example, into the position shown at Fig. 4 by the dotted lines—by turning the hand-wheel $t'$, operating a screw, $t^2$, working in a fixed nut, $t^3$, in the bracket or frame depending from the saddle $a$, (best seen at Fig. 5,) and by the collar $t^4$ on the screw $t^2$, thus raising or lowering the slide $t^5$, (sliding in frame $t^6$, fixed to the saddle $a$,) to which the arm $t$ is fixed. The arm is shown at Fig. 4 by dotted lines as having been lowered, and at Fig. 10 the saddles are shown as having been traversed, and that during such motion the saddle $a$ has gained on the saddle $a'$. Therefore the form produced on the saddle $a$ would be longer than that produced on the saddle $a'$. A scale should be provided on the link $s$ or on the slide $t^5$ to show the workman the point to which he should bring the block $s$ to suit the proportionate length of form required. By raising the block $s^3$ in the slot of the link $s$, instead of lowering same, the form to be produced would be shorter in length than the pattern, and by allowing the blocks $s^2$ $s^3$ to remain opposite to one another, as shown at Fig. 4, the saddles $a$ $a'$ would move at equal speeds and reproduce forms of equal length to that of the pattern, and as shown by the diagram view, Fig. 9. The segment-arm, which is to regulate the width and thickness of the form to be produced in order that such form should be symmetrically proportionate to the pattern in every respect, is then adjusted. Supposing the size required to be produced is to be larger than the pattern, I move the block $q^2$ by means of the screw $q^4$ upward in the slot $q^3$ to a greater distance from the center of the shaft $p$ than the length of the arm $p'$. By lowering the block $q^2$ in the slot $q^3$ a smaller form will be produced, or by moving the block $q^2$ to the same distance from the center of the shaft $p$ as the arm $p'$ a form with the same widths and thicknesses as the pattern would be produced. A scale and index, $x$, is provided, as shown at Fig. 8, carried by the shaft $p$, and pointer $q^5$ on the moving block $q^2$ indicates the height to which the block $q^2$ should be moved for the required size. The parts of the machine having been adjusted, the machine is set in motion—that is, the main driving-belt is thrown onto the fast pulley $i$, the machine being thus started from the prime mover, whether that be steam or other power or hand. The shaft $e$ is rotated, which, through pulley $u$, belt $w'$, and pulley $h^3$, drives the shaft $h^2$ on the rock-frame $f$, Fig. 2, on which the cutter-wheel $h$ is carried. The shaft $e$, through the gearing $e'$ $e^2$ $e^3$ $e^4$, drives the shaft $k$, roller $l$, and by band $k'$ the pulley $b^8$ and shaft $b^3$, carrying the bevel-wheel $b^5$. Supposing the two parts of the shaft $b^2$ and $b^3$ to be disconnected from one another, which would be caused by the clutch $b^7$ having been moved to the left hand and the bevel-wheel $b^6$ being thrown in gear with the bevel-wheels $b^5$ and $b^4$, then the shaft $b^2$ would be driven by means of this bevel-gearing in the opposite direction to the shaft $b^3$, and by this means the block from which the form is to be produced would be driven in a reverse direction to that of the pattern, and in this way a form reverse-handed to the pattern would be produced. If the bevel-wheel $b^6$ is thrown out of gear with the bevel-wheels $b^4$ and $b^5$ and the parts of the shaft $b^2$ $b^3$ connected by sliding in the feather of the clutch $b^7$, both the form and pattern would revolve in the same direction and a form would be produced of the same hand as the pattern. The shaft $k$, by pulleys $m^2$ $m^2$, drives the pulleys $m'$ $m'$, which are driven in reverse directions to one another, and which are both loose on the traversing-screw shaft $m$, the direction of the motion of the traversing-screw being regulated according to which of the two pulleys $m'$ $m'$ is held to the screw-shaft $m$ by the clutch $n$. This clutch $n$ is actuated automatically by the motion of the saddle $a'$ through a tappet action, $o'$, $o^2$, $o^3$, $o^4$, and $o^5$. The block from which the form is to be cut by the revolving cutters $h$ now rotating, as well as the pattern against which the dummy-wheel $g$ rests and at same speed, this pattern causes the pattern-wheel to be rotated and its position to be regulated in accordance with the shape of the pattern, the variations of the shape of such pattern imparting through the wheel $g$ a rocking motion to the frame $f'$, which, through connecting-rod $p^2$ and crank $p'$, communicates a more or less rocking motion to the shaft $p$, all according to the inequalities in widths or thickness of the pattern, which is being both traversed and rotated against the edge of the dummy-wheel. The rocking motion of the shaft $p$ is (through segment-arm $q$, connecting-rod $q'$, and rocking frame $f$) holding the rotating cutters $h'$ at the required distance from the lathe-centers in which the block is turning, so as to cut off the necessary material from the block in order to reproduce the form in the symmetrical proportion required. By this arrangement of mechanism I am enabled to obtain greater or less variations in the width or thickness of the last produced from one pattern—that is, the different widths or thicknesses of the produced last may be caused to be enlarged or reduced in a varying ratio to the different widths or thicknesses of the pattern. This, especially in last work, is of great importance, as I am enabled to thus maintain a symmetry of form which has not been heretofore accomplished automatically by machinery. When I use the double quadrant motion instead of the link and the single quadrant motion, instead of the block from which the form is to be cut being carried in lathe-centers, it may conveniently be carried in a traveling frame and alongside one another. Such a traveling frame, $y$, is indicated at Figs. 11 and 12. In this case the pattern may be revolved, as before described with reference to Fig. 1, by means of a roller, $l$, belt $k'$, and pulley $b^8$, or it may be caused to revolve in any other convenient and suitable manner, according to circumstances. The centers $b$ $c$, Fig. 11, carrying the block, receive motion from the centers $b'$ $c'$, Fig. 12, carrying the pattern, by gearing inclosed in traveling frame $y$, but not shown in the drawings. The connecting-rod $q'$, Fig. 12, of the segment motion for governing the relative lengths of pattern and form is jointed to the bed $y$ at one end, and at the other to the segment $q$, Fig. 12, by means of the arm $q^\times$, and of which it (the segment) may form a part. The segment $q$ is also connected to the dummy-wheel shaft $g'$ by connecting-rod $q'^\times$, while it (the segment) is centered at $p$ and carried by a similar bracket, $p^\times$, coming from the main frame of the machine, the segment $q$ being in this case centered at the center of the length of the slot $q^3$.

The rock-frames $f f'$, instead of being vertical, are horizontal and are free to rock about the centers $e$. The dummy-wheel shaft $g'$ and the cutter-wheel shaft $h^2$ pass lengthwise through the rocking frames, the shaft $g'$ being prevented from turning, but allowed an endwise motion by a feather and groove, and the shaft $h^2$ being provided with bearings in its frame and rotated by pulley $h^3$, Fig. 11, or in any other convenient manner. The distancing from the lathe-centers of the cutter-wheel to the dummy-wheel is proportionally to the pattern produced by a segment, $q$, Fig. 11, and parts connected therewith similar to the arrangement shown at Figs. 2 and 3, and the same or corresponding parts are marked with similar letters of reference. Supposing a shorter form than the pattern is to be produced, the block $q^2$, Fig. 12, is moved upward in the segment $q$ of the mechanism governing the endwise motion of the dummy-wheel to the required position above the fixed center on which the segment turns, and which positions should be indicated, as before, by an index. This movement will cause the dummy-wheel shaft $g'$ to have a motion imparted to it by the connecting-rod $q'$ lengthwise of the pattern; but, the cutter-wheel having no such motion, the dummy-wheel will travel or traverse over a greater length or distance than the cutter-wheel, and therefore a shorter form will be cut than the pattern.

By lowering block $q^2$ below the center of the slot an opposite result would take place, and so on for the intermediate positions, except when the block $q^2$ coincides with the fixed center on which the segment turns, when both the cutter and dummy wheel will each revolve in the same plane, and forms of equal length will be produced.

The adjusting of the segment mechanism for governing the variations in width or thickness of the forms to be produced, and as shown at Figs. 11 and 12, is precisely similar to that before described with reference to Figs. 1, 2, and 3. In the arrangement shown at Figs. 13 and 14 the connections between the dummy-wheel $g$, carried by the rocking frame $f'$, and the shaft $p$ is similar to that described with reference to Fig. 3. The connections between cutter-wheel $h$, carried by rocking frame $f$, and the shaft $p$ are composed of connecting-rod $q'$, which is provided with a slide or extension action with set-screw, as shown by Fig. 14, the end of the connecting-rod being jointed to the block $q^2$ in the slot $q^3$ of the arm $q$, which slot in this case is straight, instead of being curved, as in the previous figures, the slide or extension action of the connecting-rod allowing of its being lengthened or shortened as the block is raised or lowered in the slot $q^3$, and after adjustment the said slide is fixed by means of the set-screw. The dotted lines in Fig. 14 indicate the position of the dummy-wheel and connections. In the arrangement shown at Figs. 15 and 16 the frame $f'$, carrying the dummy-wheel $g$, is provided with an arm, $p^2$, fixed at a right angle therewith, the other end of the arm $p^2$ being forked and bearing on trunnions on a sliding block, $p'^\times$, on the arm $p'$, keyed to the rock-shaft $p$.

As the dummy-frame $f'$ is rocked, its varying inclination will cause the shaft $p$ to receive a rocking motion, and the block $p'^\times$ will have a slight sliding motion on the arm $p'$. This rocking motion of the shaft $p$ is communicated to an arm, $q$, on the said shaft, provided with a sliding block, $q'^\times$, which by trunnion-bearings is connected to an arm, $q'$, which is adjustable in height in a slotted link, $q^2$, fixed to the cutter-frame $f$.

The dotted lines on Fig. 16 indicate the position occupied by the dummy-wheel and connections.

I claim—

1. In a machine for turning irregular forms, the sliding saddles $a'$ and $a$, carrying, respectively, the pattern and the block to be cut, the rock-frame $f'$, wheel $g$, shaft $p$, and arm $p'$, link $p^2$, the rock-frame $f$ and cutter-wheel, the arm $q$, link $q'$, and block $q^2$, and mechanism, substantially as specified, for adjusting the same, in combination with the link $s$, swinging on a fixed pivot, the arm $t$, connected to saddle $a$, the arm $s^4$, connected to saddle $a'$, and the sliding blocks $s^2$ $s^3$, connected to the arms $s^4$ and $t$, respectively, together with the means described for adjusting the arm $t$, all as hereinbefore set forth.

2. In a machine for turning irregular forms, the combination, with the sliding saddles $a'$ and $a$, carrying, respectively, the pattern and the block to be cut, of the link $s$, swinging upon a fixed pivot, the arm $t$, connected to the saddle $a$, the arm $s^4$, connected to the saddle $a'$, the blocks $s^2$ and $s^3$, connected to the arms $s^4$ and $t$, respectively, and fitted to slide in the link $s$, and means, substantially as specified, for adjusting the arm $t$, as set forth.

3. In a machine for turning irregular forms, the combination, with the rock-frame $f'$ and wheel $g$, carried by the same, the shaft $p$, arm $p'$, and link $p^2$, of the rock-frame $f$ and cutter-wheel, the arm $q$, link $q'$, block $q^2$, and means, substantially as specified, for adjusting said block.

CHARLES W. EVANS.

Witnesses:
E. G. BREWER,
THOMAS W. ROGERS,
*Both of 33 Chancery Lane, London.*